(12) United States Patent
Pandey

(10) Patent No.: US 8,089,371 B2
(45) Date of Patent: Jan. 3, 2012

(54) LOGICAL FLOOR DETERMINATION FOR A WIRELESS DEVICE USING WEIGHTED AP RECEIVED SIGNAL STRENGTHS

(75) Inventor: Santosh G. Pandey, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 641 days.

(21) Appl. No.: 12/182,563

(22) Filed: Jul. 30, 2008

(65) Prior Publication Data
US 2010/0026513 A1 Feb. 4, 2010

(51) Int. Cl.
*G08B 13/14* (2006.01)
*G08B 1/08* (2006.01)
*H04Q 5/22* (2006.01)
*H04W 4/00* (2009.01)
*H04W 36/00* (2009.01)
*H04W 24/00* (2009.01)
*H04B 7/216* (2006.01)

(52) U.S. Cl. ............... 340/825.36; 340/572.1; 340/10.2; 340/539.13; 370/328; 370/331; 370/332; 370/335; 455/432.1; 455/436; 455/456.1

(58) Field of Classification Search .................. None
See application file for complete search history.

(56) References Cited

U.S. PATENT DOCUMENTS

| | | | |
|---|---|---|---|
| 6,674,403 B2 | 1/2004 | Gray et al. | |
| 6,799,047 B1* | 9/2004 | Bahl et al. | 455/456.1 |
| 6,978,023 B2 | 12/2005 | Dacosta | |
| 7,116,988 B2 | 10/2006 | Dietrich et al. | |
| 7,126,951 B2 | 10/2006 | Belcea et al. | |
| 7,894,412 B2 | 2/2011 | Hart et al. | |
| 7,945,270 B2* | 5/2011 | Bells et al. | 455/456.1 |
| 7,966,021 B2* | 6/2011 | Dietrich et al. | 455/456.1 |
| 2002/0141363 A1* | 10/2002 | Piirainen | 370/332 |
| 2004/0033795 A1 | 2/2004 | Walsh et al. | |
| 2005/0003827 A1 | 1/2005 | Whelan | |
| 2005/0040968 A1* | 2/2005 | Damarla et al. | 340/825.49 |
| 2005/0175121 A1* | 8/2005 | Doi | 375/316 |
| 2005/0176406 A1 | 8/2005 | Krishnakumar et al. | |
| 2005/0207381 A1 | 9/2005 | Aljadeff et al. | |

(Continued)

FOREIGN PATENT DOCUMENTS

| WO | WO 2005/091915 | 10/2005 |
|---|---|---|
| WO | WO 2005/117470 | 12/2005 |

*Primary Examiner* — George Bugg
*Assistant Examiner* — Renee Dorsey
(74) *Attorney, Agent, or Firm* — Tucker Ellis & West LLP

(57) ABSTRACT

An apparatus configured to acquire received signal strength intensities (RSSIs) for a wireless device from a plurality of access points (APs) located on a plurality logical floors. The apparatus is configured to determine which logical floor the wireless device is on by analyzing the RSSIs. The RSSIs for each floor are adjusted with an adjustment value and are selectively weighted with at least two different weight values, and the adjusted and weighted RSSIs for each floor are each summed. The floor with highest sum of adjusted or weighted RSSIs is determined to be the floor the wireless device is on. The logical floor is further determined by sorting the RSSIs for each floor and then weighting the sorted RSSIs with the different weight values. The sorted and weighted RSSIs for each floor are summed. The floor with highest sum of weighted sorted RSSIs is determined to be the floor the wireless device is on.

23 Claims, 4 Drawing Sheets

U.S. PATENT DOCUMENTS

2005/0208952 A1 9/2005 Dietrich et al.
2005/0261004 A1 11/2005 Dietrich et al.
2005/0285793 A1 12/2005 Sugar et al.
2007/0142061 A1 6/2007 Taubenheim et al.

* cited by examiner

LOGICAL FLOOR DETERMINATION FOR A WIRELESS DEVICE USING WEIGHTED AP RECEIVED SIGNAL STRENGTHS

TECHNICAL FIELD

This application is generally related to determining the location of a wireless device.

BACKGROUND

Wireless asset detection and tracking systems are increasing in prevalence as wireless systems are incorporated in buildings and other areas such as Internet kiosks and lounges. Additionally, radio-frequency identification (RFID) tags have been in use for many years for tracking assets, such as in shipping yards and facilities and in consumer outlets for inventory and theft management.

In many multi-floor deployments or in large areas it is often difficult to determine the location of client wireless devices. Received access point (AP) signal strength metrics can be used to estimate the location of the devices within the regions of interest. However, in some applications such as in deployments of devices in buildings with atriums or other unique structures or features, the AP signal strength metrics collected and used by various locating algorithms may cause processing delays, incorrect results, or require the installation of additional devices at entry/exit points.

BRIEF DESCRIPTION OF THE DRAWINGS

The accompanying drawings incorporated herein and forming a part of the specification, illustrate examples of the present invention, and together with the description serve to explain the principles of the invention.

OVERVIEW OF EXAMPLE EMBODIMENTS

Figure 1:
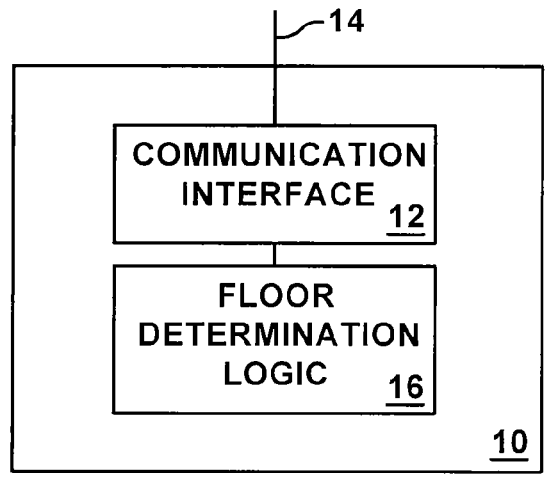
FIG. 1 is a block diagram illustrating an apparatus configured in accordance with an example embodiment.

The following presents a simplified summary of the example embodiments in order to provide a basic understanding of some aspects of the example embodiments. This summary is not an extensive overview of the example embodiments. It is intended to neither identify key or critical elements of the invention nor delineate the scope of the invention. Its sole purpose is to present some concepts of the example embodiments in a simplified form as a prelude to the more detailed description that is presented later.

In accordance with an example embodiment, there is disclosed herein, a wireless device locating apparatus comprising a communication interface and determination logic. The communication interface is configured to receive signal strength values including a first set of signal strength values for a wireless device detected at a first plurality of radio receivers disposed in a first region and a second set of signal strength values for the wireless device detected at a second plurality of radio receivers disposed in a second region. The determination logic is operatively connected with the communication interface and is configured to determine a region that the wireless device is located. In one form, the determination logic includes a first weighting portion, a first summing portion, and an identifying portion. The first weighting portion selectively weights the signal strength values of the first set of signal strength values with at least two different weight values as a first set of weighted signal strength values, and selectively weights the signal strength values of the second set of signal strength values with at least two different weight values as a second set of weighted signal strength values. The first summing portion sums the first set of weighted signal strength values as a first sum, and sums the second set of weighted signal strength values as a second sum. The identifying portion identifies the region that the wireless device is located by a comparison of the first sum with the second sum. Preferably, the logical floor having the highest sum is determined to be the floor the wireless device is on.

In another form of the wireless device locating apparatus, the determination logic includes a sorting portion sorting the signal strength values of the first set of signal strength values as a first set of sorted signal strength values and sorting the signal strength values of the second set of signal strength values as a second set of sorted signal strength values. Also, the first weighting portion is configured to selectively weight the signal strength values of the first and second sets of sorted signal strength values by applying, respectively, a first set of predetermined weights having at least two different weight values against the first set of sorted signal strength values as the first set of weighted signal strength values and a second set of predetermined weights having at least two different weight values against the second set of sorted signal strength values as the second set of weighted signal strength values.

In accordance with another example embodiment, there is disclosed herein, a method of locating a wireless device, the method comprising receiving signal strength values including a first set of signal strength values for a wireless device detected at a first plurality of radio receivers disposed in a first region and a second set of signal strength values for the wireless device detected at a second plurality of radio receivers disposed in a second region, and determining a region that the wireless device is located. The determining includes selectively weighting the signal strength values of the first set of signal strength values with at least two different weight values as a first set of weighted signal strength values, and selectively weighting the signal strength values of the second set of signal strength values with at least two different weight values as a second set of weighted signal strength values, summing the first and second sets of weighted signal strength values as a first and second sum, respectively, and identifying the region that the wireless device is located by a comparison of the first sum with the second sum. Preferably, the logical floor having the highest sum is determined to be the floor the wireless device is on.

In another form of the method of locating a wireless device, the determining includes sorting the signal strength values of the first set of signal strength values as a first set of sorted signal strength values and sorting the signal strength values of the second set of signal strength values as a second set of sorted signal strength values, and the weighting includes selectively weighting the signal strength values of the first and second sets of sorted signal strength values by applying, respectively, a first set of predetermined weights having at least two different weight values against the first set of sorted signal strength values as the first set of weighted signal strength values and a second set of predetermined weights having at least two different weight values against the second set of sorted signal strength values as the second set of weighted signal strength values.

In another form of the method of locating a wireless device, the determining includes selectively sorting and weighting the RSSI only when a difference between of the summed adjusted RSSIs of floors having the first and second highest sums are within a predetermined threshold. This enables arbitration between floor determination algorithms wherein the adjusted RSSIs may be used directly in one floor determination algorithm and, in another algorithm, the RSSIs are selectively sorted and weighted. Preferably, the adjusting includes adding a predetermined adjustment value to each of the AP RSSI values. Also, preferably, the weighting includes multiplying each of the AP RSSI values with at least two different predetermined weighting values.

In accordance with another example embodiment, there is disclosed herein a method of locating an associated wireless device. The method includes receiving signal strength values including a first set of signal strength values for an associated wireless device detected at a first plurality of radio receivers disposed in a first region and a second set of signal strength values for the associated wireless device detected at a second plurality of radio receivers disposed in a second region; and, determining a region that the associated wireless device is located by: comparing the first set of signal strength values with the second set of signal strength values; and based on a result of the comparing, identifying the region that the associated wireless device is located by i) a first manipulation of the first and second sets of signal strength values or ii) a second manipulation of the first and second sets of signal strength values different than the first manipulation, the first manipulation including a weighting of the first and second sets of signal strength values and the second manipulation including an adjusting of the first and second sets of signal strength values.

There is shown and described herein example embodiments of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawings and descriptions herein will be regarded as illustrative in nature and not as restrictive.

DESCRIPTION OF EXAMPLE EMBODIMENTS

This description provides examples not intended to limit the scope of the invention, as claimed. The figures generally indicate the features of the examples, where it is understood and appreciated that like reference numerals are used to refer to like elements.

FIG. 1 is a block diagram illustrating a floor determination apparatus 10 configured in accordance with an example embodiment. Apparatus 10 comprises a communication interface 12 with a communication link 14 configured to be coupled to a network (not shown) that spans multiple physical and/or logical floors or any other desired or selected region, space or area. Communication link can be a wired link (e.g. a coaxial cable, cat. 5 link, etc.) or a wireless (e.g. RF, IR, etc.) connection. Communication interface 12 receives data from a plurality of access points (APs). The received data includes Received Signal Strength Indicator (RSSI) data of signals received from a wireless device (which may be is referred to herein as a 'wireless client' or 'client').

Floor determination logic 16 is in data communication with communication interface 12. Floor determination logic is configured to receive RSSI data from communication interface 12 and perform an algorithm for determining the floor the client is on. "Logic" and "signal" as used herein, includes but is not limited to hardware, firmware, software and/or combinations of each to perform a function(s) or an action(s), and/or to cause a function or action from another component. For example, based on a desired application or need, signals may be based in hardware or software and logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that can be executed by a processor and signal may be software code, software steps, and/or data stored in memory.

Although as described herein, floor determination apparatus 10 is configured to determine the floor a wireless device is on, floor determination apparatus may also be configured with additional logic for determining the location of the wireless device on or within the floor or within any other area or space (logical floor) as well. In addition, floor determination apparatus 10 may be co-located with another device, such as a server (e.g. an Authentication, Authorization and Accounting 'AAA' server, location determination server) or any other type of network device such as a wireless domain controller (WDS) or access point (AP).

In practice it has been observed that the strongest APs are usually outliers when an incorrect floor is estimated. This may be due to various structural limitations or configurations or for other physical or electromagnetic properties or parameters for a given application. As an example, deployment of wireless locating devices in structures having atriums often results in highly skewed results placing or determining the client devices to be on incorrect floors.

However, in accordance with the present example embodiments, the AP weights can be changed on a case by case basis to adjust for applications, constraints and circumstances. Preferably, interfloor wireless device locating scheme improvement is realized when the second strongest AP is weighted higher than the others in a given logical floor.

In an example embodiment, floor determination logic 16 determines which floor the wireless device is on by selectively weighting the RSSIs and summing, for each logical floor, the weighted RSSIs received by each AP. The floor having the highest sum is then selected as the floor where the wireless device is located. In one form, the RSSI are first sorted before they are weighted. Preferably then, the second strongest AP is weighted higher than the remaining APs for each given floor. This enables the outliers noted above to be addressed and their influences appropriately suppressed or muted. This is especially useful for use of the subject floor determination system and method in structures or areas where incorrect floor estimations are likely to occur. The RSSIs received by each AP are selectively weighted as noted above, selectively sorted and weighted, selectively adjusted and weighted, and selectively adjusted, sorted, and weighted in the several example embodiments set out herein.

In another form, the RSSI are selectively sorted and weighted only when a difference between the summed adjusted RSSIs of adjacent floors having the first and second highest sums are within a predetermined threshold. This enables arbitration between floor determination algorithms wherein the adjusted RSSIs may be used directly in one floor determination algorithm and, in another algorithm, the RSSIs are selectively sorted and weighted. Preferably, the adjusting includes adding a predetermined adjustment value to each of the AP RSSI values. Also, preferably, the weighting includes multiplying each of the AP RSSI values with at least two different predetermined weighting values.

The following variables will be used to describe the example embodiments and their definitions are provided as follows:

M: total number of logical floors
$N_j$: number of APs on $j^{th}$ logical floor that report RSSI
$AP_{ij}$: ith AP RSSI value (in dBm) on the $j^{th}$ logical floor
$(X+AP_{ij})$ adjusted (by X) ith AP RSSI value (in dBm) on the $j^{th}$ logical floor
wt_i weights for weighting unsorted AP RSSI list
wt_sort_i: weights for weighting sorted AP RSSI list
$W_j$: weight of the calculated $j^{th}$ logical floor
threshold a predetermined value selectable by a user
maxk($AP_{ij}$): $k^{th}$ strongest AP on $j^{th}$ logical floor (if not present, then replace by some default minimum value (e.g. −120 dBm)))
maxk($W_j$): the $k^{th}$ largest $W_j$
maxk_j($W_j$): logical floor which has kth largest ($W_j$)
    note: (max1_j($W_j$) represents the logical floor with max ($W_j$)

In one example embodiment, a wireless device locating method and apparatus is provided for determining a logical floor that the wireless device is located at by weighting the unadjusted or "raw" AP signal strength values $AP_{ij}$ directly with a set of weights wt_i for the non-sorted AP RSSI list, summing them, and choosing a logical floor according to:

```
For j = 1:M
    W_j = sum(wt_i * (AP_ij)) for i = 1, ..., N_j
Chosen_Floor = max1_j(W_j)
```

It is to be appreciated that the set of weights wt_i may be a predefined set of fixed values such as 0.5, 1.0, 0.5, 0.5, 0.5, etc., or the set of weights wt_i may be adjusted or variable based on the AP RSSI values such as, for example:

```
       wt_i = APij/max(AP_ij)
or
       wt_i = 0.5   for AP < −100 db
       wt_i = 1.0   for −100 db < AP < −20 db
       wt_i = 0.5   for −20 db < AP
```

In another example, a wireless device locating method and apparatus is provided for determining a logical floor that the wireless device is located at by weighting the adjusted AP signal strength values $(X+AP_{ij})$, where X=90 in the example, directly with a set of weights wt_i for the non-sorted AP RSSI list, summing them, and choosing a logical floor according to:

```
For j = 1:M
    W.sub.j= sum(wt_i * (X + AP.sub.ij)) for i = 1, ..., N.sub.j
Chosen_Floor = max1_j(W.sub.j)
```

In yet another example embodiment, a wireless device locating method and apparatus is provided for determining a logical floor that the wireless device is located at by first sorting the unadjusted or "raw" AP signal strength values $AP_{ij}$ then weighting the sorted AP signal strength values using predetermined weights wt_sort_i for the sorted AP RSSI list, summing them, and choosing a logical floor according to:

```
For j = 1:M
    AP_ij = sort(AP_ij)
    W_j = sum(wt_sort_i * (AP_ij)) for i = 1, ..., N_j
Chosen_Floor = max1_j(W_j)
```

It is to be appreciated that the set of weights wt_sort_i may be a predefined set of fixed values such as 0.5, 1.0, 0.5, 0.5, 0.5, etc., or the set of weights wt_sort_i may be adjusted or variable based on the AP RSSI values such as, for example:

```
       wt_sort_i = APij/max(AP_ij)
or
       wt_sort_i = 0.5   for AP < −100 db
       wt_sort_i = 1.0   for −100 db < AP < −20 db
       wt_sort_i = 0.5   for −20 db < AP
```

In still yet another example embodiment, a wireless device locating method and apparatus is provided for determining a logical floor that the wireless device is located at by first sorting the adjusted AP signal strength values $(X+AP_{ij})$, where X=90 in the example, then weighting the sorted AP signal strength values using predetermined weights for the sorted AP RSSI list, summing them, and choosing a logical floor according to:

```
For j = 1:M
    AP_ij = sort(AP_ij)
    W_j = sum(wt_sort_i * (90 + AP_ij)) for i = 1, ..., N_j
Chosen_Floor = max1_j(W_j)
```

In yet another example embodiment, a wireless device locating method and apparatus is provided for determining a logical floor that the wireless device is located at by arbitrating between floor determination algorithms or methods according to:

```
W_j = sum(X+A_ij), for i = 1, ..., N_j and j = 1, ..., M
If max1(W_j) − max2(W_j) <= threshold
    For j = 1:M
        W_j = sum(wt_i * (AP_ij)) for i = 1, ..., N_j
    Chosen_Floor = max1_j(W_j)
```

In still yet another example embodiment, a wireless device locating method and apparatus is provided for determining a logical floor that the wireless device is located at by arbitrating between floor determination algorithms or methods according to:

```
W_j = sum(X'+A_ij), for i = 1, ..., N_j and j = 1, ..., M
If max1(W_j) − max2(W_j) <= threshold
    For j = 1:M
        W_j = sum(wt_i * (X + AP_ij)) for i = 1, ..., N_j
    Chosen_Floor = max1_j(W_j)
```

In the above and in the example embodiments to be described below, X' may be the same as or different from X as necessary or desired by the user of the system.

In still yet another example embodiment, a wireless device locating method and apparatus is provided for determining a logical floor that the wireless device is located at by arbitrating between floor determination algorithms or methods according to:

```
W_j = sum(X'+A_{ij}), for i = 1, ..., N_j and j = 1, ..., M
If max1(W_j) – max2(W_j) <= threshold
   For j = 1:M
      AP_{ij} = sort(AP_{ij})
      W_j = sum(wt_sort_i * (AP_{ij})) for i = 1, ..., N_j
Chosen_Floor = max1_j(W_j)
```

In yet still a further example embodiment, a wireless device locating method and apparatus is provided for determining a logical floor that the wireless device is located at by arbitrating between floor determination algorithms or methods according to:

```
W_j = sum(X'+A_{ij}), for i = 1, ..., N_j and j = 1, ..., M
If max1(W_j) – max2(W_j) <= threshold
   For j = 1:M
      AP_{ij} = sort(AP_{ij})
      W_j = sum(wt_sort_i * (X + AP_{ij})) for i = 1, ..., N_j
Chosen_Floor = max1_j(W_j)
```

Figure 2:
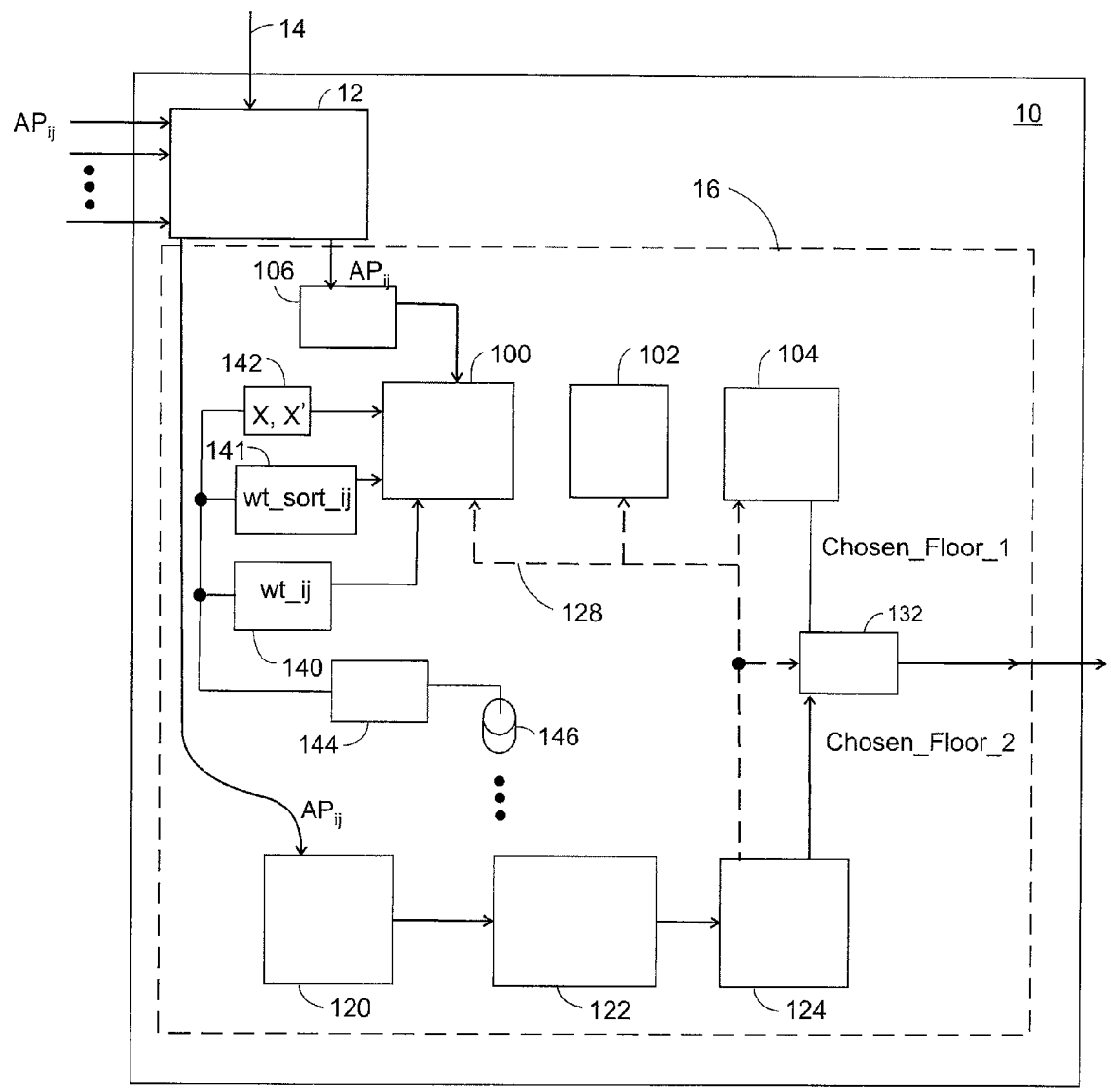
FIG. 2 is a more detailed block diagram of the apparatus shown in FIG. 1.

With reference to FIG. 2, the communication interface 12 of the floor determination apparatus 10 of the example embodiment is configured to receive signal strength values $AP_{ij}$ including a first set of signal strength values $AP_{i1}$ for a wireless device detected at a first plurality of radio receivers disposed in a first logical floor, a second set of signal strength values $AP_{i2}$ for a wireless device detected at a second plurality of radio receivers disposed in a second logical floor, . . . , and an $M^{th}$ set of signal strength values $AP_{iM}$ for a wireless device detected at an $M^{th}$ plurality of radio receivers disposed in an $M^{th}$ logical floor. The determination logic 16 of the example embodiment includes a first adjusting and weighting portion 100, a first summing portion 102, an identifying portion 104 identifying the region that the wireless device is located, and having a first memory 140 storing weights wt_i to be selectively applied to the non-sorted AP RSSI list, a second memory 141 storing weights wt_sort_i to be selectively applied to the sorted AP RSSI list, and a third memory 142 storing adjustment values X, X' to be applied to the raw AP signal strength values, such as by adding X to the raw AP values. It is to be appreciated that X may be selected to be or take on a null or 0 value as necessary or desired by the user of the system.

In a first example embodiment without sorting, the first adjusting and weighting portion 100 selectively adjusts and selectively weights the signal strength values $AP_{ij}$ (where $AP_{ij}=i^{th}$ AP RSSI value on $j^{th}$ floor) of a first set of signal strength values $A_{i1}$ for i=1, . . . , $N_1$ (where $N_1$=number of APs on $1^{st}$ logical floor that report RSSI) with an adjustment value X and with at least two different weight values wt_i (weights for weighting non-sorted AP RSSI list) as a first set of weighted signal strength values (wt_i*(X+$AP_{i1}$)), selectively adjusts and selectively weights the signal strength values $AP_{ij}$ of the second set of signal strength values $A_{i2}$ for i=1, . . . , $N_2$ (where $N_2$=number of APs on $2^{nd}$ logical floor that report RSSI) with an adjustment value X and with at least two different weight values as a second set of weighted signal non-sorted strength values (wt_i*(X+$AP_{i2}$)), . . . , and selectively adjusts and selectively weights the signal strength values $AP_{ij}$ of the $M^{th}$ set of signal strength values $A_{iM}$ for i=1, . . . , $N_M$ (where $N_M$=number of APs on $M^{th}$ logical floor that report RSSI) with an adjustment value X and with at least two different weight values as an $M^{th}$ set of weighted signal strength values (wt_i*(X+$AP_{iM}$)). The weighting values wt_i are stored and retrieved from the memory 140 and the adjustment value X is stored and retrieved from the memory 142. The first summing portion 102 sums the first set of weighted signal strength values (wt_i*(X+$AP_{i1}$)) as a first sum $W_j$=sum (wt_i*(X+$AP_{ij}$)), where j=1, sums the second set of weighted signal strength values (wt_i*(X+$AP_{i2}$)) as a second sum $W_j$=sum (wt_i*(X+$AP_{ij}$)), (where j=2), . . . , and sums the $M^{th}$ set of weighted signal strength values (wt_i*(X+$AP_{iM}$)) as an $M^{th}$ sum $W_j$=sum (wt_i*(X+$AP_{ij}$)), (where j=M). The identifying portion 104 identifies the region that the wireless device is located by a comparison of the first through $M^{th}$ sums and generates a Chosen_Floor_1 signal 130 according to Chosen_Floor_1=max1_j($W_j$).

In this example embodiment, the adjusting and weighting portion 100, the summing portion 102, and the identifying portion 104 collectively identify the region that the wireless device is located by:

```
For j = 1:M
   W_j = sum(wt_i * (X + AP_{ij})) for i = 1, ..., N_j
Chosen_Floor_1 = max1_j(W_j)
```

In the above example it is to be appreciated that the raw or unadjusted AP signal strength values $AP_{ij}$ may be used such as by setting X=0, as one preferred example, or any of a variety of selectable adjusted AP signal strength values $AP_{ij}$ may be used such as by setting X=90, as in one preferred example and X=180 in another.

In an example embodiment with sorting and with continued reference to FIG. 2, the determination logic 16 of the floor determination apparatus 10 includes a second memory 141 storing weight values wt_sort_i and a sorting portion 106 selectively sorting the signal strength values of the first set of signal strength values as a first set of sorted signal strength values $AP_{i1}$=sort($AP_{i1}$), selectively sorting the signal strength values of the second set of signal strength values as a second set of sorted signal strength values APi2=sort(APi2), . . . , and selectively sorting the signal strength values of the $M^{th}$ set of signal strength values as an $M^{th}$ set of sorted signal strength values $AP_{iM}$=sort($AP_{iM}$). The first adjusting and weighting portion 100 is configured to selectively adjusts and selectively weight the sorted signal strength values of the first through $M^{th}$ sets of signal strength values by applying, respectively, an adjustment value X and a first set of predetermined weights having at least two different weight values against the first set of sorted signal strength values as the first set of weighted signal strength values, applying an adjustment value X and a second set of predetermined weights having at least two different weight values against the second set of sorted signal strength values as the second set of weighted signal strength values, and applying an adjustment value X and an Mth set of predetermined weights having at least two different weight values against the $M^{th}$ set of sorted signal strength values as the Mth set of weighted signal strength values. The identifying portion 104 identifies the region that the wireless device is located by a comparison of the first through $M^{th}$ sums as Chosen_Floor_1.

In particular, in the example embodiment with sorting, the sorting portion 106 selectively sorts the signal strength values of the first through $M^{th}$ sets of signal strength values as first through $M^{th}$ sets of sorted signal strength values according to $AP_{iM}$=sort($AP_{iM}$). The first adjusting and weighting portion 100 selectively adjusts and selectively weights the signal strength values $AP_{ij}$ (where $AP_{ij}=i^{th}$ AP RSSI value on $j^{th}$ floor) of the first set of signal strength values $A_{i1}$ for i=1, . . . , $N_1$ (where $N_1$=number of APs on $1^{st}$ logical floor that report RSSI) with an adjustment value X and with at least two different weight values wt_sort_i (weights for weighting sorted AP RSSI list) as a first set of weighted signal strength values (wt_sort_i*(90+$AP_{i1}$)), selectively adjusts and selectively weights the signal strength values $AP_{ij}$ of the second set of signal strength values $A_{i2}$ for i=1, ..., $N_2$ (where $N_2$=number of APs on $2^{nd}$ logical floor that report RSSI) with an adjustment value X and with at least two different weight values as a second set of weighted signal strength values (wt_sort_i*(X+$AP_{i2}$)), ..., and selectively adjusts and selectively weights the signal strength values $AP_{ij}$ of the $M^{th}$ set of signal strength values $A_{iM}$ for i=1, ..., $N_M$ ($N_M$ number of APs on $M^{th}$ logical floor that report RSSI) with an adjustment value and with at least two different weight values as an $M^{th}$ set of weighted signal strength values (wt_sort_i*(X+$AP_{iM}$)). The first summing portion 102 sums the first set of weighted signal strength values (wt_sort_i*(X+$AP_{i1}$)) as a first sum $W_j$=sum (wt_sort_i*(X+$AP_{ij}$)), where j=1, sums the second set of weighted signal strength values (wt_sort_i*(X+$AP_{i2}$)) as a second sum $W_j$=sum (wt_sort_i*(X+$AP_{ij}$)), (where j=2), ..., and sums the $M^{th}$ set of weighted signal strength values (wt_sort_i*(X+$AP_{iM}$)) as an $M^{th}$ sum $W_j$=sum (wt_sort_i*(X+$AP_{ij}$)), (where j=M). The identifying portion 104 identifies the region that the wireless device is located by a comparison of the first through $M^{th}$ sums and generates a Chosen_Floor_2 signal 131 according to Chosen_Floor_2=max1_j($W_j$) wherein the first adjusting and weighting portion 100, the summing portion 102, and the identifying and summing portions 104, 106 collectively identify the region that the wireless device is located according to:

```
For j = 1:M
    AP_ij = sort(AP_ij)
    W_j = sum(wt_sort_i * (X + AP_ij)) for i = 1, ..., N_j
    Chosen_Floor_1 = max1_j(W_j)
```

In the above example it is to be appreciated that the raw or unadjusted AP signal strength values $AP_{ij}$ may be used such as by setting X=0, as one preferred example, or any of a variety of selectable adjusted AP signal strength values $AP_{ij}$ may be used such as by setting X=90, as in one preferred example and X=180 in another. With yet continued reference to FIG. 2, the determination logic 16 of the communication interface 12 of the floor determination apparatus 10 of the example embodiment includes an adjusting portion 120, a second summing portion 122, and a determining portion 124. The adjusting portion 120 adjusts the signal strength values $AP_{ij}$ with a constant adjustment value X for scaling purposes. For example, the first set of signal strength values $AP_{i1}$ are adjusted with a predetermined weight value (X=90) as a first set of adjusted signal strength values (90+$AP_{i1}$), the signal strength values of the second set of signal strength values ($AP_{i2}$) are adjusted with the predetermined adjustment value (+90) as a second set of adjusted signal strength values (90+$AP_{i2}$), ..., and the signal strength values of the $M^{th}$ set of signal strength values ($AP_{iM}$) are adjusted with the predetermined adjustment value (+90) as a further set of adjusted signal strength values (90+$AP_{i(M+M)}$). The second summing portion 122 sums the sets of adjusted signal strength values. For example, the second summing portion 122 sums the first set of adjusted signal strength values (90+$A_{i1}$) as a first sum of adjusted values $W_j$=sum(90+$A_{i1}$), sums the second set of adjusted signal strength values (90+$A_{i2}$) as a second sum of adjusted values $W_j$=sum(90+$A_{i2}$), ..., and sums the further set of adjusted signal strength values (90+$A_{i2}$) as a further sum of adjusted values $W_j$=sum(90+$A_{i(M+M)}$).

The determining portion 124 generates a weighting signal 128 to selectively weight (rather than simply adjust) the signal strength values of the first through Mth sets of signal strength values when a difference between the first and second highest calculated floor weights $W_j$ values is less than a predetermined threshold value "threshold". Preferably, the adjusting includes adding a predetermined adjustment value to each of the AP RSSI values. Also, preferably, the weighting includes multiplying each of the AP RSSI values with at least two different predetermined weighting values.

The first adjusting and weighting portion 100 is responsive to the signal 128 from the determining portion 124 to weight the signal strength values of the first through Mth sets of signal strength values as said first and second sets of weighted signal strength values respectively when said weighting signal 128 is generated. Similarly, the first summing portion 102 is responsive to the signal 128 from the determining portion 124 to sum the first through $M^{th}$ sets of weighted signal strength values as the first and second sums respectively when the weighting signal 128 is generated. And, further, a selection circuit 132 is responsive to the determining portion to i) identify the region that the wireless device is located by a comparison of the first through $M^{th}$ weighted sums when the weighting signal 128 is generated, and ii) identify the region that the wireless device is located by a comparison of the first through $M^{th}$ adjusted sums when the weighting signal 128 is not generated. That is, Chosen_Floor_1 is selected as the output of the system 10 when the weighting signal 128 is generated and Chosen_Floor_2 is selected as the output of the system 10 when the weighting signal 128 is not generated.

Accordingly, overall, the determination logic 16 is configured to determine a logical floor at which the wireless device is located by discriminating between an algorithm using adjusted signal strength values and an algorithm using selectively sorted and weighted signal strength values according to:

```
W_j = sum(X'+A_ij), for i = 1, ..., N_j and j = 1, ..., M
If max1(W_j) - max2(W_j) <= threshold
    For j = 1:M
        AP_ij = sort(AP_ij)
        W_j = sum(wt_sort_i * (X + AP_ij)) for i = 1, ..., N_j
Chosen_Floor = max1_j(W_j)
```

In the example embodiment described immediately above, the adjusted AP RSSI values are selectively replaced with weighted AP RSSI values when a magnitude of a difference between the first and second signal strengths for a given floor is small and, in particular, when the magnitude of the difference is less than the predetermined threshold. As noted above, it has been observed in practice that the strongest APs are usually outliers when an incorrect floor is estimated. By selectively weighting the APs, incorrect floor estimations can be reduced. By selectively sorting then weighting the APs, incorrect floor estimations can further be reduced.

Preferably, in one example, the AP weights may be, 0.5, 1.0, 0.5, 0.5, 0.5, etc. However, other sets of AP weight values may be used to realize favorable results and as may be desired or necessary to adjust for physical or electromagnetic characteristics of the application such as when the wireless device is to be located in a building having an atrium, for example or in applications where the radio receivers have different gain and/or other performance characteristics. In addition and as described above, it is to be appreciated that the set of weights may be a predefined set of fixed values or they may be adjusted or variable based on the AP RSSI values.

It is to be appreciated that, for specific particular applications, the weighting function can be executed manually by an operator of the system to account for specific known structures of features in the target environment of the wireless devices. To that end, first, second, and third memories 140, 141, and 142 are provided in the apparatus 10. The memories 140, 141, and 142 are operatively connected with the communication interface and the determination logic, the memory being configured to store the first and second sets of predetermined weight values and adjustment values, respectively. In addition, a user interface 144 is operatively connected with the communication interface, the determination logic, and the memory. The user interface provides a means for enabling a user of the wireless device locating apparatus to selectively modify the first, second, and $M^{th}$ sets of predetermined adjustment values and weight values. Still further, a database 146 is included in the system for storing and manipulating the predetermined weights and for collecting and storing various operational, performance, and other data.

In addition to the above, it is to be appreciated that additional example embodiments include extensions of the single dimensional cases described above into two or more dimensions. Here, one dimension includes a time dimension. That is, the various adjustment values and/or weight values are time dependent. Further, the weights for the sorted and/or unsorted AP RSSI lists may be selected based on logical floor wherein wt_ij are the weights for weighting the unsorted AP RSSI list for the $j^{th}$ floor and wt_sort_ij are the weights for weighting the sorted AP RSSI list for the $j^{th}$ floor.

In these embodiments a wireless device locating method and apparatus is provided for determining a logical floor that the wireless device is located at by arbitrating between floor determination algorithms or methods according to:

$$W_j = \text{sum}(X'+A_{ij}), \text{ for } i = 1, ..., N_j \text{ and } j = 1, ..., M$$
$$\text{If max1}(W_j) - \text{max2}(W_j) <= \text{threshold}$$
$$\quad \text{For } j = 1{:}M$$
$$\quad\quad W_j = \text{sum}(\text{wt\_ij} * (AP_{ij})) \text{ for } i = 1, ..., N_j$$
$$\text{Chosen\_Floor\_2} = \text{max1\_j}(W_j)$$

In still yet another example embodiment, a wireless device locating method and apparatus is provided for determining a logical floor that the wireless device is located at by arbitrating between floor determination algorithms or methods according to:

$$W_j = \text{sum}(X'+A_{ij}), \text{ for } i = 1, ..., N_j \text{ and } j = 1, ..., M$$
$$\text{If max1}(W_j) - \text{max2}(W_j) <= \text{threshold}$$
$$\quad \text{For } j = 1{:}M$$
$$\quad\quad W_j = \text{sum}(\text{wt\_ij} * (X + AP_{ij})) \text{ for } i = 1, ..., N_j$$
$$\text{Chosen\_Floor\_2} = \text{max1\_j}(W_j)$$

In still yet another example embodiment, a wireless device locating method and apparatus is provided for determining a logical floor that the wireless device is located at by arbitrating between floor determination algorithms or methods according to:

$$W_j = \text{sum}(X'+A_{ij}), \text{ for } i = 1, ..., N_j \text{ and } j = 1, ..., M$$
$$\text{If max1}(W_j) - \text{max2}(W_j) <= \text{threshold}$$
$$\quad \text{For } j = 1{:}M$$
$$\quad\quad AP_{ij} = \text{sort}(AP_{ij})$$
$$\quad\quad W_j = \text{sum}(\text{wt\_sort\_ij} * (AP_{ij})) \text{ for } i = 1, ..., N_j$$
$$\text{Chosen\_Floor\_1} = \text{max1\_j}(W_j)$$

In yet still a further example embodiment, a wireless device locating method and apparatus is provided for determining a logical floor that the wireless device is located at by arbitrating between floor determination algorithms or methods according to:

$$W_j = \text{sum}(X'+A_{ij}), \text{ for } i = 1, ..., N_j \text{ and } j = 1, ..., M$$
$$\text{If max1}(W_j) - \text{max2}(W_j) <= \text{threshold}$$
$$\quad \text{For } j = 1{:}M$$
$$\quad\quad AP_{ij} = \text{sort}(AP_{ij})$$
$$\quad\quad W_j = \text{sum}(\text{wt\_sort\_ij} * (X + AP_{ij})) \text{ for } i = 1, ..., N_j$$
$$\text{Chosen\_Floor\_1} = \text{max1\_j}(W_j)$$

Figure 3:
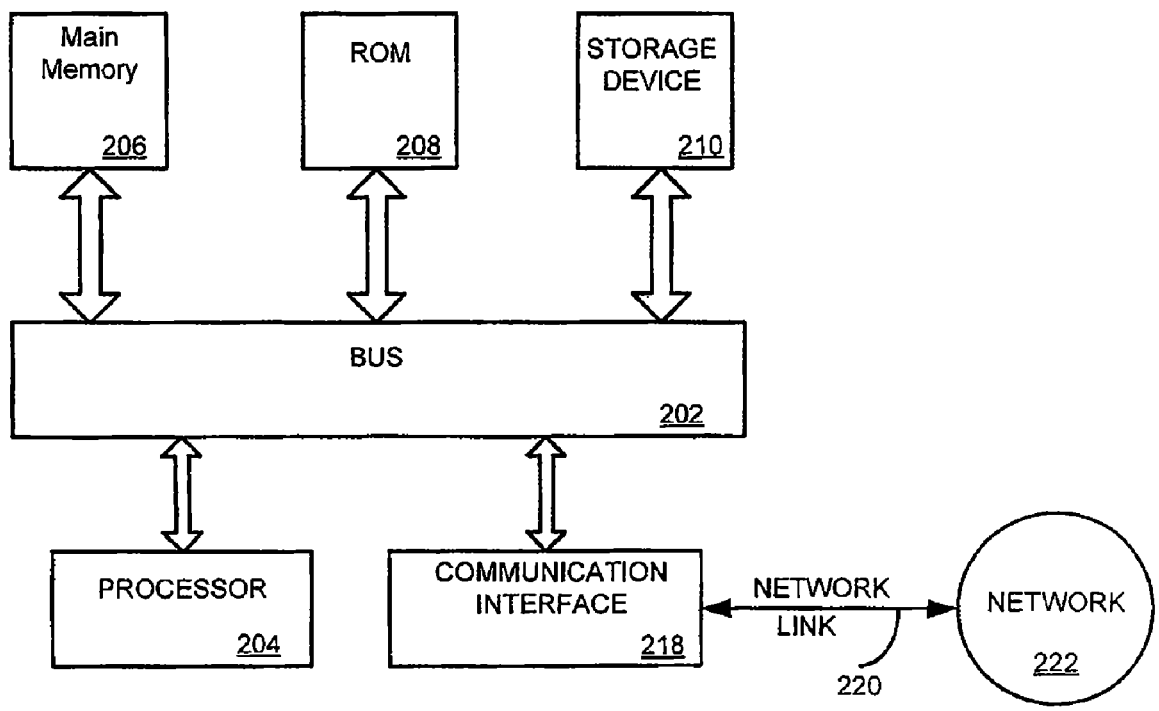
FIG. 3 is a block diagram of a computer system for implementing an example embodiment.

FIG. 3 is a block diagram of a computer system 200 for implementing an example embodiment. For example, computer system 200 is suitably adapted for implementing floor determination apparatus 10 (FIG. 1). Computer system 200 includes a bus 202 or other communication mechanism for communicating information and a processor 204 coupled with bus 202 for processing information. Computer system 200 also includes a main memory 206, such as random access memory (RAM) or other dynamic storage device coupled to bus 202 for storing information and instructions to be executed by processor 204. Main memory 206 also may be used for storing a temporary variable or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

An aspect of the invention is related to the use of computer system 200 for floor determination of a wireless device. According to one embodiment of the invention, floor determination of a wireless device is provided by computer system 200 in response to processor 204 executing one or more sequences of one or more instructions contained in main memory 206. Such instructions may be read into main memory 206 from another computer-readable medium, such as storage device 210. Execution of the sequence of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to non-volatile media, volatile media, and transmission media. Non-volatile media include for example optical or magnetic disks, such as storage device 210. Volatile media include dynamic memory such as main memory 206. Transmission media include coaxial cables, copper wire and fiber optics, including the wires that comprise bus 202. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206 from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a network 222. For example, communication interface 218 may be a local area network (LAN) card to provide a data communication connection to a compatible LAN. Wireless links may also be implemented. In any such implementation, communication interface 218 sends and receives electrical, electromagnetic, or optical signals that carry digital data streams representing various types of information.

Network link 220 typically provides data communication through one or more networks to other data devices, such as APs. For example, network link 220 may provide a connection through network 222 to the Internet. Networks 222 and the Internet 228 may use electrical, electromagnetic, or optical signals that carry the digital data to and from computer system 200, which are exemplary forms of carrier waves transporting the information.

Computer system 200 can send messages and receive data, including program codes, through the network(s), network link 220, and communication interface 218. In the Internet example, a server (not shown) might transmit a requested code for an application program through the Internet to network 222, and communication interface 218. In accordance with the invention, one such downloaded application provides for floor determination of a wireless device as described herein.

The received code may be executed by processor 204 as it is received, and/or stored in storage device 210, or other non-volatile storage for later execution. In this manner, computer system 200 may obtain application code in the form of a carrier wave.

Figure 4:
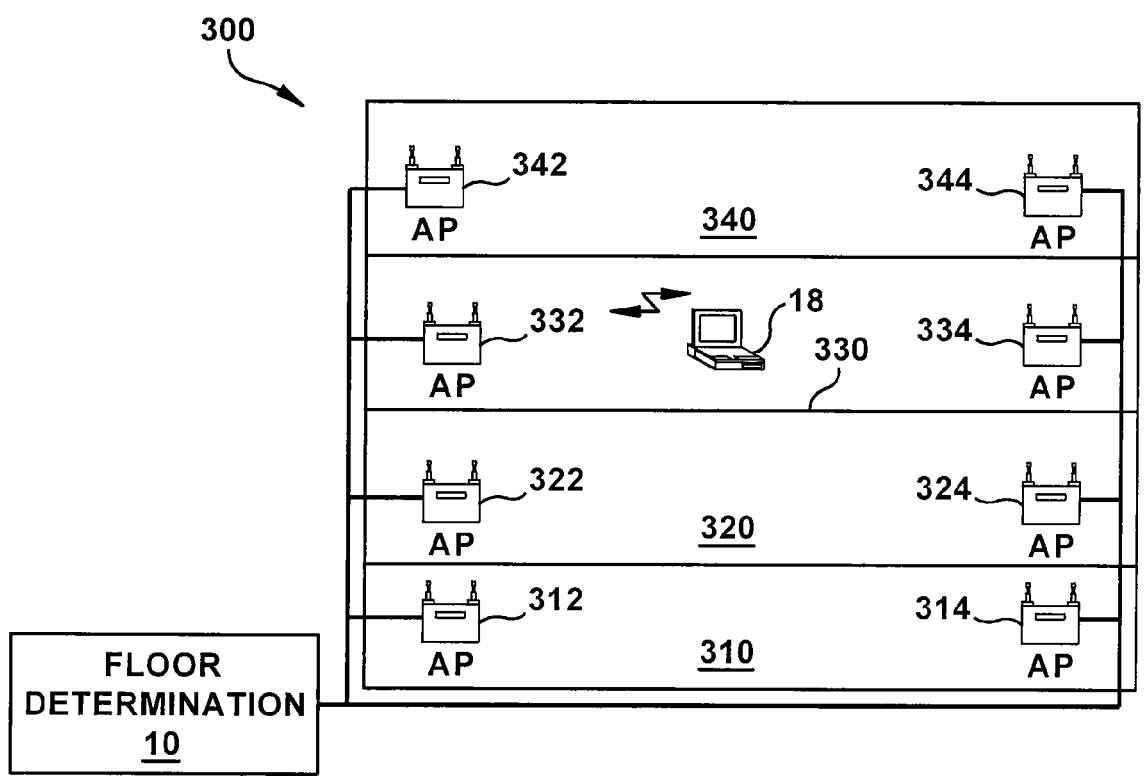
FIG. 4 illustrates an example of a network implementing floor determination.

FIG. 4 illustrates an example of a network 300 implementing floor determination. As illustrated, network 300 includes four floors 310, 320, 330, 340. Floor 310 comprises access points 312, 314. Floor 320 comprises access points 322, 324. Floor 330 comprises access points 332, 334. Floor 340 comprises access points 342, 344. Access points 312, 314, 322, 324, 332, 334, 342, 344 are in data communication with floor determination apparatus 10. When wireless device 18 transmits, access points 312, 314, 322, 324, 332, 334, 342, 344 send RSSI data to floor determination apparatus 10. In particular embodiments, an AP that does not receive a signal from device 18 does not send RSSI data to floor determination apparatus 10, in which case floor determination apparatus can use this missing RSSI in the probability calculations in a way that tends to exclude nearby regions. In an example embodiment, access points 312, 314, 322, 324, 332, 334, 342, 344 also send AP-AP RSSI data to floor determination server 10. For example AP 312 can send the RSSI data for signals received from APs 314, 322, 324, 332, 334, 342, 344. This RSSI data may be corrected (by removing the effects of different antenna gains and/or different transmit powers) so the RSSI data is closer to an RSSI from a client under or nearby AP 312 to APs 314-344. Based on the RSSI data received from access points 312, 314, 322, 324, 332, 334, 342, 344, floor determination apparatus 10 can determine the floor (floor 330 in the example illustrated in FIG. 3) that the associated wireless device 18 is on.

Although network 300 illustrates a selected number of floors and APs on each floor, those skilled in the art should readily appreciate that the number of floors and/or APs on the floors can be any physically realizable number. The number of floors and APs selected for network 300 were merely selected for ease of illustration and should no way be construed as limiting the number of floors or APs that the apparatuses or methods described herein are capable of handling.

Figure 5:
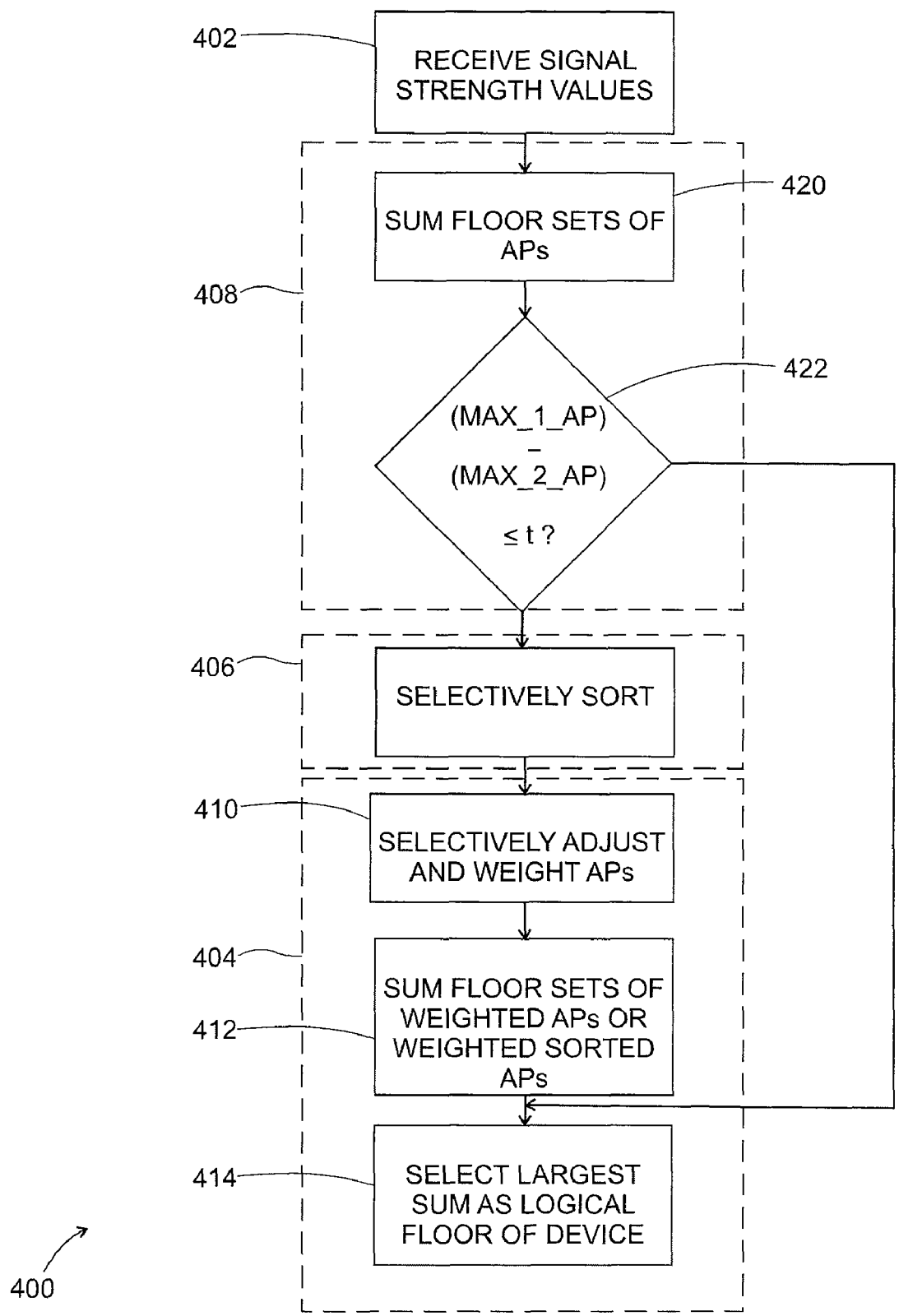
FIG. 5 illustrates an example methodology for determining the floor a client is on based on adjusted RSSI values.

In view of the foregoing structural and functional features described above, methodology in accordance with example embodiments will be better appreciated with reference to FIG. 5. While, for purposes of simplicity of explanation, the methodology of FIG. 5 is shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement a methodology in accordance with an aspect the example embodiment. Embodiments of the present invention are suitably adapted to implement the methodology in hardware, software, or a combination thereof.

FIG. 5 illustrates an example methodology 400 for determining the floor a client is on based on selectively weighted RSSI values. In one example embodiment of the illustrated method, AP signals are received at step 402 and they are weighted, summed, and thereafter a floor of the wireless device is determined at step 404. In another example embodiment of the illustrated method 400, AP signals are received at step 402, they are adjusted and sorted at step 406, and they are weighted 410, summed 412, and thereafter a floor of the wireless device is determined 414 in step 404. In still yet another example embodiment of the illustrated method 400, AP signals are received at step 402, they are summed 420 and a threshold determination 422 is made in step 408, the signals are sorted at step 406, and they are weighted, summed, and thereafter a floor of the wireless device is determined at step 404.

It is to be appreciated in FIG. 5 that the steps 406 and 408 are not executed in the embodiment where the method locates the wireless device according to:

For j = 1:M
$W_j = \text{sum}(wt\_sort\_i * (90 + AP_{ij}))$ for i = 1, ..., $N_j$
Chosen_Floor = $\text{max1}\_j(W_j)$ It is to be further appreciated in FIG. 5 that the step 408 is not executed in the embodiment where the method locates the wireless device according to:

For j = 1:M
$AP_{ij} = \text{sort}(AP_{ij})$
$W_j = \text{sum}(wt\_sort\_i * (90 + AP_{ij}))$ for i = 1, ..., $N_j$
Chosen_Floor = $\text{max1}\_j(W_j)$ However, for convenience, each of the sorting 406 and threshold determining 408 steps are illustrated in the linear flow to facilitate easier description of the example embodiments.

What has been described above includes example implementations. It is, of course, not possible to describe every conceivable combination of components or methodologies for purposes of describing the present invention, but one of ordinary skill in the art will recognize that many further combinations and permutations are possible. Accordingly, the scope of the appended claims interpreted in accordance with the breadth to which they are fairly, legally and equitably entitled include all such equivalents, alterations, modifications and variations.

The invention claimed is:

1. A wireless device locating apparatus, the apparatus comprising:
a communication interface configured to receive signal strength values including a first set of signal strength values for an associated wireless device detected at a first plurality of radio receivers disposed in a first region and a second set of signal strength values for the associated wireless device detected at a second plurality of radio receivers disposed in a second region; and,
determination logic operatively connected with the communication interface and being configured to determine a region that the associated wireless device is located, the determination logic including:
a first weighting portion selectively weighting the signal strength values of the first set of signal strength values with at least two different weight values as a first set of weighted signal strength values, and selectively weighting the signal strength values of the second set of signal strength values with at least two different weight values as a second set of weighted signal strength values;
a first summing portion summing the first set of weighted signal strength values as a first weighted sum, and summing the second set of weighted signal strength values as a second weighted sum; and,
an identifying portion identifying the region that the wireless device is located by a comparison of the first weighted sum with the second weighted sum.

2. An apparatus according to claim 1 wherein:
the determination logic includes a sorting portion selectively sorting the signal strength values of the first set of signal strength values as a first set of sorted signal strength values and sorting the signal strength values of the second set of signal strength values as a second set of sorted signal strength values; and,
the first weighting portion is configured to selectively weight the signal strength values of the first and second sets of sorted signal strength values by applying, respectively, a first set of predetermined weights having at least two different weight values against the first set of sorted signal strength values as said first set of weighted signal strength values and a second set of predetermined weights having at least two different weight values against the second set of sorted signal strength values as said second set of weighted signal strength values.

3. An apparatus according to claim 2 wherein said determination logic further includes:
an adjusting portion adjusting the signal strength values of the first set of signal strength values with a predetermined adjustment value as a first set of adjusted signal strength values, and adjusting the signal strength values of the second set of signal strength values with said predetermined adjustment value as a second set of adjusted signal strength values;
a second summing portion summing the first set of adjusted signal strength is values as a first adjusted sum, and summing the second set of adjusted signal strength values as a second adjusted sum; and,
a determining portion generating a weighting signal when a difference between said first and second adjusted sums is less than a predetermined threshold value and identifying the region that the wireless device is located by a comparison of the first adjusted sum with the second adjusted sum.

4. An apparatus according to claim 3 further including:
a selection circuit responsive to the determining portion to i) identify the region that the wireless device is located by said comparison of the first weighted sum with the second weighted sum when the weighting signal is generated, and ii) identify the region that the wireless device is located by said comparison of the first adjusted sum with the second adjusted sum when the weighting signal is not generated.

5. An apparatus according to claim 4 wherein:
the first weighting portion is responsive to the determining portion to weight the signal strength values of the first and second sets of signal strength values with said first and second sets of predetermined weights as said first and second sets of weighted signal strength values respectively only when said weighting signal is generated; and,
the first summing portion is responsive to the determining portion to sum the first and second sets of weighted signal strength values as the first and second weighted sums respectively only when said weighting signal is generated.

6. An apparatus according to claim 2 further including:
a first memory operatively connected with the communication interface and the determination logic, the first memory being configured to store the predetermined adjustment value; and,
a second memory operatively connected with the communication interface and the determination logic, the second memory being configured to store the first and second sets of predetermined weights.

7. An apparatus according to claim 6 further including:
a user interface operatively connected with the communication interface, the determination logic, and the first and second memories, the user interface providing a means for enabling a user of the wireless device locating apparatus to selectively modify: i) the first and second sets of adjustment values or ii) the first and second sets of predetermined weights; and,
a database including said first and second memories for enabling the associated user to selectively manipulate: i) said first and second sets of predetermined weights or ii) said first and second sets of adjustment values.

8. An apparatus according to claim 2 wherein:
the first weighting portion is configured to selectively weight the signal strength values of the first and second sets of signal strength values based, respectively, on first and second sets of selectable weights.

9. An apparatus according to claim 2 wherein:
the communication interface is configured to acquire received signal strength indicator (RSSI) data for the associated wireless device as said first and second sets of signal strength values.

10. A method of locating an associated wireless device, the method comprising:
receiving signal strength values including a first set of signal strength values for an associated wireless device detected at a first plurality of radio receivers disposed in a first region and a second set of signal strength values for the associated wireless device detected at a second plurality of radio receivers disposed in a second region; and, determining a region that the associated wireless device is located by:

selectively weighting the signal strength values of the first set of signal strength values with at least two different weight values as a first set of weighted signal strength values, and selectively weighting the signal strength values of the second set of signal strength values with at least two different weight values as a second set of weighted signal strength values;

summing the first set of weighted signal strength values as a first weighted sum, and summing the second set of weighted signal strength values as a second weighted sum; and, identifying the region that the wireless device is located by a comparison of the first weighted sum with the second weighted sum.

11. A method according to claim 10 wherein:

the determining includes selectively sorting the signal strength values of the first set of signal strength values as a first set of sorted signal strength values and sorting the signal strength values of the second set of signal strength values as a second set of sorted signal strength values; and, the weighting includes selectively weighting the signal strength values of the first and second sets of sorted signal strength values by applying, respectively, a first set of predetermined weights having at least two different weight values against the first set of sorted signal strength values as said first set of weighted signal strength values and a second set of predetermined weights having at least two different weight values against the second set of sorted signal strength values as said second set of weighted signal strength values.

12. A method according to claim 11 wherein the determining further includes:

adjusting the signal strength values of the first set of signal strength values with a predetermined adjustment value as a first set of adjusted signal strength values, and adjusting the signal strength values of the second set of signal strength values with said predetermined adjustment value as a second set of adjusted signal strength values;

summing the first set of adjusted signal strength values as a first adjusted sum, and summing the second set of adjusted signal strength values as a second sum; and, generating a weighting signal when a difference between said first and second adjusted sums is less than a predetermined threshold value.

13. A method according to claim 12 wherein:

the identifying includes, responsive to the determining portion and when said weighting signal is generated, i) identifying the region that the wireless device is located by a comparison of the first weighted sum with the second weighted sum when the weighting signal is generated, and ii) identifying the region that the wireless device is located by a comparison of the first adjusted sum with the second adjusted sum when the weighting signal is not generated.

14. A method according to claim 13 wherein:

the weighting includes, responsive to the determining portion and only when said weighting signal is generated, weighting the signal strength values of the first and second sets of signal strength values with said first and second sets of predetermined weights as said first and second sets of weighted signal strength values respectively; and, the summing includes, responsive to the determining portion and only when said weighting signal is generated, summing the first and second sets of weighted signal strength values as the first and second weighted sums respectively.

15. A method according to claim 11 further including:

storing the adjustment value in a first memory; and, storing the weight values in a second memory.

16. A method according to claim 15 further including selectively modifying the adjustment value or the weight values using a user interface.

17. A method according to claim 11 wherein:

the weighting includes selectively weighting the signal strength values of the first and second sets of signal strength values based, respectively, on first and second sets of selectable weights.

18. A method according to claim 11 wherein:

the receiving includes acquiring received signal strength indicator (RSSI) data for the wireless device as said first and second sets of signal strength values.

19. A method of locating an associated wireless device, the method comprising:

receiving signal strength values including a first set of signal strength values for an associated wireless device detected at a first plurality of radio receivers disposed in a first region and a second set of signal strength values for the associated wireless device detected at a second plurality of radio receivers disposed in a second region; and, determining a region that the associated wireless device is located by:

comparing said first set of signal strength values with said second set of signal strength values; and based on a result of said comparing, identifying the region that the associated wireless device is located by one of a group consisting of a first manipulation of the first and second sets of signal strength values, and a second manipulation of the first and second sets of signal strength values different than the first manipulation, the first manipulation including a weighting of said first and second sets of signal strength values and the second manipulation including an adjusting of said first and second sets of signal strength values.

20. The method according to claim 19 wherein said determining includes determining the region that the associated wireless device is located according to:

$$W_j = \text{sum}(X + A_{ij}), \text{ for } i = 1, ..., N_j \text{ and } j = 1, ..., M$$
$$\text{If max1}(W_j) - \text{max2}(W_j) <= \text{threshold}$$
$$\quad \text{For } j = 1 : M$$
$$\quad\quad AP_{ij} = \text{sort}(AP_{ij})$$
$$\quad\quad W_j = \text{sum}(wt\_sort\_i * (X + AP_{ij})) \text{ for } i = 1, ..., N_j$$
$$\text{Chosen\_Floor} = \text{max1\_j}(W_j)$$

wherein:

M: is the total number of logical floors $N_j$: is the number of APs on $j^{th}$ logical floor that report RSSI $AP_{ij}$: are the ith AP RSSI values (in dBm) on the $j^{th}$ logical floor (X+APij) adjusted ith AP RSSI values on the $j^{th}$ logical floor wt_i are the weights for weighting unsorted AP RSSI list wt_sort_i: are the weights for weighting sorted AP RSSI list $W_j$: is the weight of the calculated $j^{th}$ logical floor maxk($AP_{ij}$): is the kth strongest AP on $j^{th}$ logical floor (if not present, then replace by some default minimum value (e.g. −120 dBm)))

maxk($W_j$): is the the $k^{th}$ largest $W_j$ maxk_j($W_j$): is the logical floor which has kth largest ($W_j$).

21. The method according to claim 19 wherein said determining includes determining the region that the associated wireless device is located according to:

$$W_j = \text{sum}(X+A_{ij}), \text{ for } i = 1, ..., N_j \text{ and } j = 1, ..., M$$
$$\text{If max1}(W_j) - \text{max2}(W_j) <= \text{threshold}$$
$$\quad \text{For } j = 1:M$$
$$\quad\quad W_j = \text{sum}(wt\_i * (X + AP_{ij})) \text{ for } i = 1, ..., N_j$$
$$\text{Chosen\_Floor} = \text{max1\_j}(W_j)$$

wherein:

M: is the total number of logical floors $N_j$: is the number of APs on $j^{th}$ logical floor that report RSSI $AP_{ij}$: are the ith AP RSSI values (in dBm) on the $j^{th}$ logical floor (X+APij) adjusted ith AP RSSI values on the $j^{th}$ logical floor wt_i are the weights for weighting unsorted AP RSSI list wt_sort_i: are the weights for weighting sorted AP RSSI list $W_j$: is the weight of the calculated $j^{th}$ logical floor maxk($AP_{ij}$): is the $k^{th}$ strongest AP on $j^{th}$ logical floor (if not present, then replace by some default minimum value (e.g. −120 dBm)))

maxk($W_j$): is the the $k^{th}$ largest $W_j$ maxk_j($W_j$): is the logical floor which has kth largest ($W_j$).

22. The method according to claim 19 wherein said determining includes determining the region that the associated wireless device is located according to:

$$W_j = \text{sum}(X+A_{ij}), \text{ for } i = 1, ..., N_j \text{ and } j = 1, ..., M$$
$$\text{If max1}(W_j) - \text{max2}(W_j) <= \text{threshold}$$
$$\quad \text{For } j = 1:M$$
$$\quad\quad AP_{ij} = \text{sort}(AP_{ij})$$
$$\quad\quad W_j = \text{sum}(wt\_sort\_ij * (X + AP_{ij})) \text{ for } i = 1, ..., N_j$$
$$\text{Chosen\_Floor} = \text{max1\_j}(W_j)$$

wherein:

M: is the total number of logical floors $N_j$: is the number of APs on $j^{th}$ logical floor that report RSSI $AP_{ij}$: are the ith AP RSSI values (in dBm) on the $j^{th}$ logical floor (X+APij) adjusted ith AP RSSI values on the $j^{th}$ logical floor wt_ij are the weights for weighting unsorted AP RSSI list for jth floor wt_sort_ij: are the weights for weighting sorted AP RSSI list for the jth floor $W_j$: is the weight of the calculated $j^{th}$ logical floor maxk($AP_{ij}$): is the $k^{th}$ strongest AP on $j^{th}$ logical floor (if not present, then replace by some default minimum value (e.g. −120 dBm)))

maxk($W_j$): is the the $k^{th}$ largest $W_j$ maxk_j($W_j$): is the logical floor which has kth largest ($W_j$).

23. The method according to claim 19 wherein said determining includes determining the region that the associated wireless device is located according to:

$$W_j = \text{sum}(X+A_{ij}), \text{ for } i = 1, ..., N_j \text{ and } j = 1, ..., M$$
$$\text{If max1}(W_j) - \text{max2}(W_j) <= \text{threshold}$$
$$\quad \text{For } j = 1:M$$
$$\quad\quad W_j = \text{sum}(wt\_i * (X + AP_{ij})) \text{ for } i = 1, ..., N_j$$
$$\text{Chosen\_Floor} = \text{max1\_j}(W_j)$$

wherein:

M: is the total number of logical floors $N_j$: is the number of APs on $j^{th}$ logical floor that report RSSI $AP_{ij}$: are the ith AP RSSI values (in dBm) on the $j^{th}$ logical floor (X+APij) adjusted ith AP RSSI values on the $j^{th}$ logical floor wt_ij are the weights for weighting unsorted AP RSSI list for the jth floor wt_sort_ij: are the weights for weighting sorted AP RSSI list for the jth floor $W_j$: is the weight of the calculated $j^{th}$ logical floor maxk($AP_{ij}$): is the $k^{th}$ strongest AP on $j^{th}$ logical floor (if not present, then replace by some default minimum value (e.g. −120 dBm)))

maxk($W_j$): is the the $k^{th}$ largest $W_j$ maxk_j($W_j$): is the logical floor which has kth largest ($W_j$).

* * * * *